June 6, 1967  J. K. MILLS  3,324,377
REGULATED INVERTER SYSTEM
Filed June 6, 1963  2 Sheets-Sheet 1
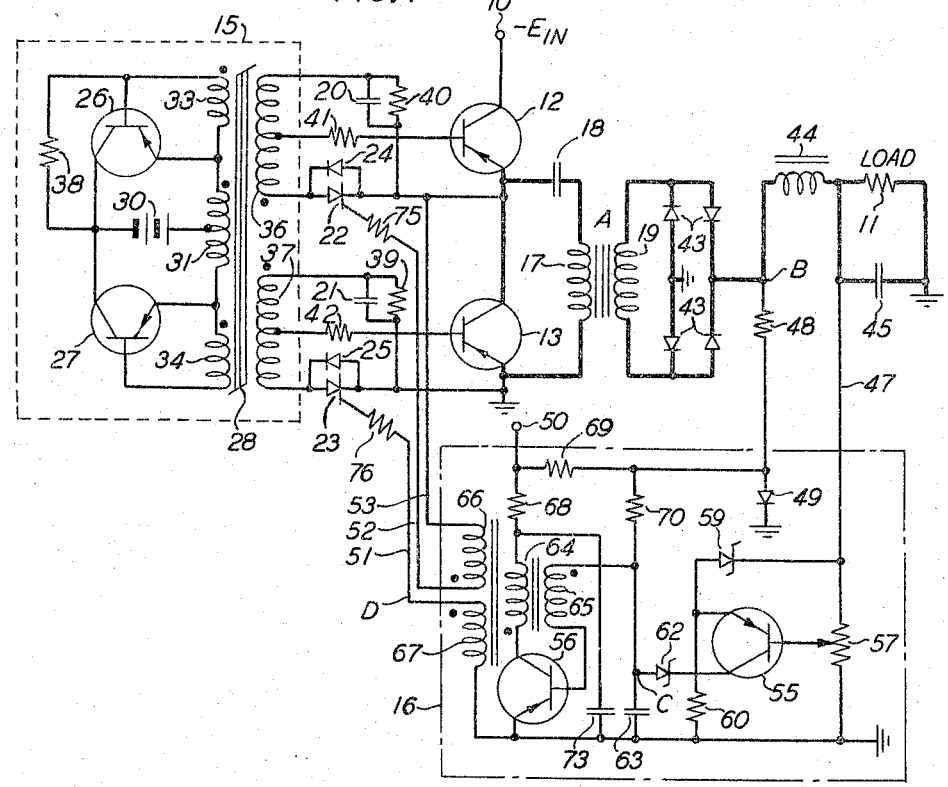
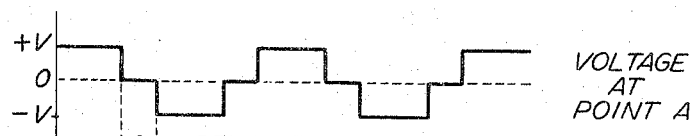
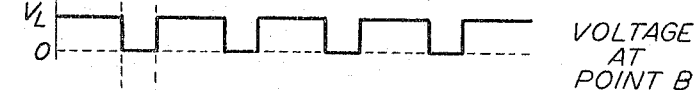
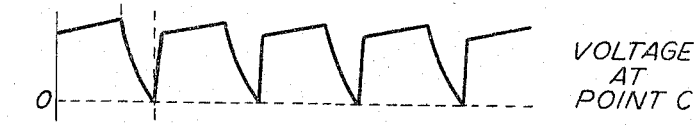
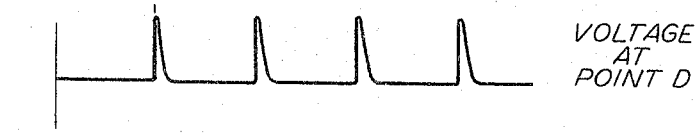
INVENTOR
J. K. MILLS
BY
Ray M. Porter Jr.
ATTORNEY

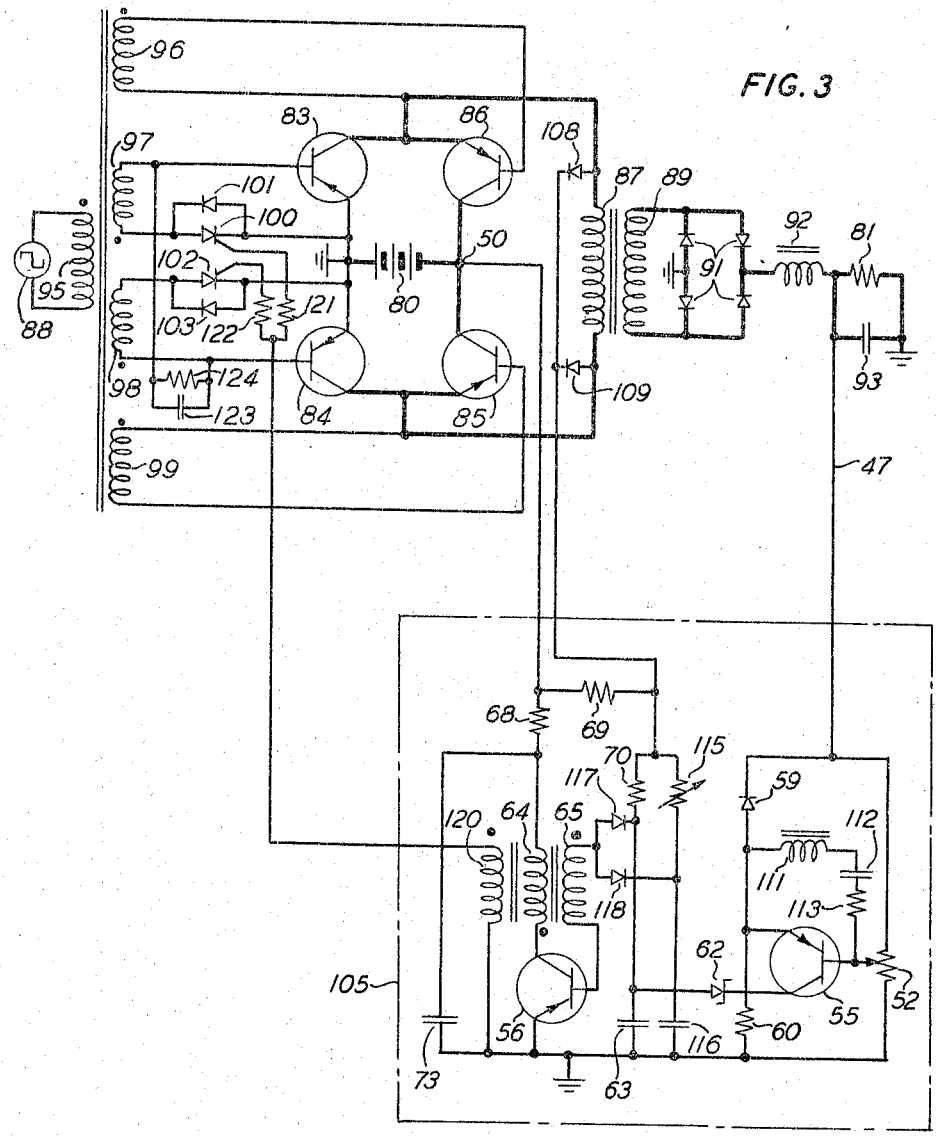

United States Patent Office 3,324,377
Patented June 6, 1967

3,324,377
REGULATED INVERTER SYSTEM
John K. Mills, Morristown, N.J., assignor to Bell Telephone Laboratories, Incorporated, New York, N.Y., a corporation of New York
Filed June 6, 1963, Ser. No. 286,086
6 Claims. (Cl. 321—16)

This invention relates to electrical power conversion apparatus and more particularly, although in its broader aspects not exclusively, to apparatus for regulating the amount of electrical energy delivered to a load from a source of direct-current potential.

In modern electrical and electronic systems, it is often necessary to convert a direct-current voltage from an available source into a second direct-current voltage having a more desirable magnitude. A particularly satisfactory method of accomplishing such voltage conversion is to employ "inverter" circuitry for intermittently interrupting or inverting the direct-current supply voltage in order to create alternating-current energy which, by means of known voltage multiplication and rectification techniques, may be in turn converted into a second direct-current voltage of increased or decreased magnitude.

Although it is well known that electromechanical devices or vacuum tubes may be used to accomplish the desired direct-current to alternating-current conversion, recent advances in semiconductor technology have shown that solid-state switches, such as junction transistors, may be used to advantage in such applications. A discussion of the operating characteristics of these devices appears in an article entitled, "Junction Transistors Used as Switches," by R. L. Bright which appeared on pages 111 to 121 of the March 1955 issue of "The Transactions of the A.I.E.E."

Merely converting the direct-current source voltage into another voltage of more desirable magnitude is not always sufficient. Many systems require that such voltages be regulated as well. In many electronic systems, for example, the operating voltages delivered by a power supply must remain substantially constant even through the impedance represented by the loading circuitry varies over a wide range of values. Even small changes in the magnitude of the voltages supplied might seriously affect the operation of some forms of equipment. Accordingly, it has often been necessary in the past to interpose between a transistor inverter and the connected load a regulating arrangement for insuring that the load voltage remains at some predetermined constant amplitude.

It is a principal object of the present invention to perform the combined functions of the transistor inverter and the regulator by means of a single "regulated inverter."

It is a further object of the present invention to improve the efficiency and reliability of regulated solid-stage power supplies while, at the same time, reducing their complexity.

In a principal aspect, the present invention takes the form of a power inverter incorporating means for regulating the average magnitude of output energy delieveored to a connected load. In the inverter, a unidirectional potential is applied to at least a pair of transistors which are switched ON and OFF in phase opposition such that an alternating current, flowing first through one transistor and then the other, is developed. According to one feature of the invention, the base current which turns ON each transistor is blocked for a specific delay time following the other transistors having turned OFF, the length of this delay period being varied in response to load voltage fluctuations to provide output voltage regulation. According to a further feature of the invention, PNPN semiconductor devices and diodes are employed in a novel gating circuit to control transistor switching in response to time-positioned pulses.

These and other features, objects, and advantages of the present invention will become more apparent upon consideration of the following detailed description of two specific embodiments of the invention. This description may best be understood when taken with the accompanying drawings in which:

FIG. 1 is a schematic diagram of a half-bridge inverter circuit including a regulating arrangement according to the invention;

FIG. 2 illustrates several waveforms which appear at various points in the inverter of FIG. 1; and FIG. 3 shows a full bridge inverter which employs the principles of the present invention.

The arrangement pictured in FIG. 1 converts a negative supply voltage which is applied to terminal 10 into a regulated positive voltage which is delivered to a load 11. The inverter portion of the power supply comprises a pair of transistor switches 12 and 13 which are turned rapidly ON and OFF in phase-opposition by the combined action of an oscillator section 15, a control circuit 16, and PNPN devices 22 and 23. Whenever transistor 12 is ON and transistor 13 is OFF, current flows from ground through primary winding 17, capacitor 18, and the collector-emitter path of transistor 12 to the terminal 10. Capacitor 18 is charged during this half-cycle. When transistor 12 is turned OFF and transistor 13 is ON, capacitor 18 is allowed to discharge thereby driving current in the reverse direction through primary winding 17. An alternating current is thus created in winding 17 which induces another alternating-current voltage in secondary winding 19. This alternating-current voltage is then rectified, filtered and delivered to the load 11. According to a feature of the present invention, whenever one of the two switching transistors 12 or 13 is turned OFF, the other transistor is not turned ON immediately but rather remains in a non-conductive state for a length of time, "α." The second transistor is held in an OFF condition during the period "α" because the connected PNPN device blocks the forward-biasing potential obtained from oscillator 15 until a pulse is generated by control circuit 16. The charges stored on capacitors 20 and 21 hold transistors 12 and 13 respectively in an OFF condition during this blocking period. Whenever a firing pulse appears, the PNPN device becomes conductive and allows forward-biasing base current to flow in the connected transistor, thereby turning it ON. The control circuit 16 comprises pulse-position-modulation circuitry which varies the time position of the PNPN firing pulses in response to load voltage fluctuations. By regulating the length of time in which the two switching transistors are held in a nonconductive state, load voltage regulation is achieved.

The oscillator section 15 determines the operating frequency of the power conversion apparatus. The oscillator section 15, a circuit of well-known design, comprises a pair of transistors 26 and 27 which operate in conjunction with a transformer having a saturable core 28. The collector electrodes of transistors 26 and 27 are connected in common to the negative terminal of a battery 30. The positive terminal of the battery 30 is connected to the center tap of a winding 31 which is wound on core 28. The emitter electrodes of transistors 26 and 27 are connected to the respective ends of winding 31. Transistors 26 and 27 are provided with control windings 33 and 34, respectively, which are connected between the base and emitter electrodes. The oscillator section 15 delivers two square-wave output voltages, each 180 degrees out of phase from the other. These voltages appear at two tapped output windings 36 and 37 which are wound on the saturable core 28.

A starting resistance 38 initiates self-oscillation in the oscillator section 15. Current flows from the negative terminal of battery 30 through the starting resistance 38 to initially forward-bias transistor 26. Current then begins to flow through the upper half of winding 31 and the collector-emitter path of transistor 26. The feedback voltage induced in the winding 33 holds transistor 36 ON until the core 28 saturates. At that time, the forward bias is removed from transistor 26 turning it OFF. The decrease in current in the upper half of winding 31 causes a voltage to be induced in control winding 34 which is appropriate for forward-biasing transistor 27. Transistor 27 accordingly turns ON and current begins to flow in the lower half of winding 31. This current continues to flow until core 28 once again saturates at which time the cycle repeats. As may be seen from the dot convention employed in FIG. 1, the two output windings 36 and 37 deliver voltages which are in phase-opposition.

The rectangular-wave output voltages delivered on oscillator section 15 turn transistors 12 and 13 ON and OFF in alternation. The winding 36 is serially connected with the parallel combination of capacitor 20 and a resistance 40 as well as the parallel combination of diode 24 and PNPN device 22. Resistance 41 connects between the base of transistor 12 and the tap on winding 36. The junction of resistance 40 and diode 34 connects to the emitter of transistor 12. The winding 37 is similarly connected with resistance 39, diode 25, PNPN device 23, capacitor 21, resistance 42 and transistor 13, respectively.

It should be noted that even though one of the output windings 36 or 37 delivers a voltage appropriate for turning the connected transistor ON, forward-biasing base current cannot flow until the serially connected PNPN device becomes conductive. While the forward-biasing base current is blocked, the charges stored on capacitor 20 and 21 holds the transistors OFF. Thus, whenever the voltage at the base electrode of transistor 13 becomes positive, turning transistor 13 OFF, transistor 12 remains in an OFF condition even though the voltage induced in winding 36 is appropriate for turning it ON, because of the fact that the PNPN device 22 is nonconductive. The transistor 12 will remain in an OFF condition until a firing pulse from control circuit 16 allows PNPN device 22 to become conductive.

The transistors 12 and 13, since they are turned ON and OFF in phase-opposition, cause an alternating current to flow through the winding 17 as discussed precordingly induced in winding 19, is rectified by the conventional bridge circuit comprising the four diodes 43. A filter choke 44 is interposed between the output of the bridge circuit and the load 11. A filtering capacitor 45 is connected in parallel with the load 11.

The diodes 24 and 25 provide reverse-current paths around the PNPN devices 22 and 23 respectively. Thus, during the time in which oscillator 15 delivers reverse-biasing current to transistor 12, current flow through the diode 24 to charge capacitor 20. The capacitor and diode thus form a source of a turn OFF voltage during the time PNPN device 22 is forward biased but not yet "fired."

In order to more clearly understand the operation of the arrangement shown in FIG. 1, it will be helpful at this time to consider the waveforms shown in FIGS. 2A and 2B of the drawings. FIG. 2A illustrates the waveform of the potential existing at point A, the junction of capacitor 18 and winding 17. This wave shape may be explained as follows. The transistor switches 12 and 13 are turned ON and OFF at a sufficiently rapid rate such that the charge on capacitor 18 remains substantially constant. For purposes of illustration, the voltage across capacitor 18 may be assumed to be approximately one-half of $-E_{in}$, the voltage which is applied to terminal 10. Whenever transistor 13 is ON, the emitter of transistor 12 is substantially connected to ground and the voltage at point A (with respect to ground) is merely the voltage across capacitor 18. Whenever transistor 12 is ON, the magnitude of voltage at point A is substantially equal to $E_{in}$ minus the voltage across capacitor 18. When both transistors 12 and 13 are OFF, no current flows through the winding 17 and point A is at substantially ground potential. The voltage induced in winding 19 possesses a similar wave shape to that shown in FIG. 2A such that a rectified voltage as shown in FIG. 2B appears at point B, the output of the bridge rectifier. If inductor 44 possesses at least the critical inductance necessary for continuous flow of current through its winding, the smoothed output voltage delivered to load 11 will be integrated by inductor 44 and capacitor 45 to a value substantially the same as the average voltage at point B.

The control circuit 16 comprises pulse position modulation circuitry which varies the time position of the PNPN firing pulses in response to load voltage fluctuations. The control circuit 16 is provided with a load voltage input conductor 47, a synchronization input which comprises the combination of resistance 48 and diode 49 which are connected in series between point B and ground, and a supply voltage input which is connected to the negative input terminal 50. The arrangement delivers output pulses to the PNPN devices 22 and 23 by means of conductors 51, 52 and 53.

Control circuit 16 comprises an error detector stage including transistor 55 and an output pulse generator which includes a transistor 56. In the error detector, a tapped resistance 57 is connected between the load voltage input conductor 47 and ground. The base electrode of the transistor 55 is connected to the tap on resistance 57. The series combination of a Zener diode 59 and a resistance 60 is connected in parallel with the resistance 57. The emitter electrode of the transistor 55 is connected to the junction of the Zener diode 59 and resistance 60. The collector electrode of transistor 55 is connected to ground by the series combination of a Zener diode 62 and timing capacitor 63.

The output pulse generator of control circuit 16 employs a combination feedback and output transformer which comprises a primary winding 64, a feedback winding 65 and two output windings 66 and 67. The primary winding 64 is serially connected with a resistance 68 and the collector emitter path of transistor 56 between ground and the negative supply terminal 50. A resistance 69 is serially connected with a resistance 70 between the negative supply terminal 50 and point C, the junction of timing capacitor 63 and Zener diode 62. The feedback winding 65 connects point C to the base electrode of the transistor 56. A filter capacitor 73 is connected in parallel with the primary winding 64 and the collector-emitter path of transistor 56. Output pulses from the control circuit 16 appear at the secondary windings 66 and 67.

In order to more clearly understand the operation of the control circuit 16, it may be assumed that the transistor 56 is initially turned OFF, thus allowing the capacitor 73 to charge through resistance 68 to a value approximately equal to the negative voltage applied to supply terminal 50. It may also be assumed that either transistor 12 or transistor 13 is turned ON, thus applying a positive voltage to point B and clamping the anode of diode 49 to ground. Thus, the junction of resistances 69 and 70 is at ground potential and the timing capacitor 63 is charged to some positive value due to the current flowing through the collector-emitter path of transistor 55. Thus, it may be seen that this positive voltage across the timing capacitor 63 applies a reverse bias to the emitter base junction of transistor 56 holding that transistor OFF, the condition previously assumed. As soon as both transistors 12 and 13 are OFF, the positive voltage is removed from point B and timing capacitor 63 discharges through resistances 70 and 69 into the negative terminal 50 as shown in FIG. 2C. When the voltage across capacitor 63 reaches a substantially zero potential, transistor 56 becomes forward-biased and begins to conduct. The current flowing through the primary winding 64 induces a voltage in feedback winding 65 appropriate for turning transistor 56 ON still further. At this time transistor 56 is kept ON by current flow from winding 65 through the base to emitter junction and capacitor 63. When the capacitor 63 is fully charged the base current is blocked and the current through the collector and winding 64 is shut OFF. Transistor 56 is thus turned OFF and the current flow through primary winding 64. The pulse of current which flows through primary winding 64 induces pulse voltages in the secondary windings 66 and 67. Consequently, both PNPN devices 22 and 23 receive positive going impulses at their gating electrodes through resistances 75 and 76, respectively. The time position of these pulses is shown in FIG. 2D of the drawings.

It may be noted that the rate at which the timing capacitor 63 discharges is determined in part by the conductivity state of the error detecting transistor 55. If load voltage should increase, the voltage drop across resistance 57 increases and transistor 55 becomes more conductive. An increased amount of current then flows through transistor 55 toward point C. The rate at which timing capacitor 63 discharges is accordingly decreased and the time at which transistor 56 becomes conductive is retarded. Thus, the firing pulses delivered to the PNPN devices 22 and 23 appear at a later point in time than before and the transistors 12 and 13 are consequently turned ON at a later time than before. In other words, the delay time "α" as shown in FIG. 2A is increased.

As soon as the PNPN devices receive an impulse from control circuit 16, the forward-biasing potential from the oscillator 15 is immediately gated to the connected switching transistor. This forward-biasing potential is of sufficient magnitude to drive the transistor quickly into a saturated conductive condition. By minimizing the transition time between an OFF condition and a saturated ON condition, the PNPN devices provide a significant decrease in the total amount of heat which the switching transistor must dissipate.

The regulated inverter pictured in FIG. 3 of the drawings converts a negative voltage obtained from the battery 80 into a regulated positive voltage which is delivered to the load 81. As in FIG. 1, those conductors which carry the power from the source 80 to the load 81 are shown as heavy line segments. In this embodiment of the invention, four switching transistors 83 through 86 are employed to convert the direct-current supply voltage from the battery 80 into an alternating current which flows through primary winding 87 of the power transformer. The four switching transistors, 83 through 86, are actuated in response to the square wave switching voltage developed by the oscillator 88. The wave shape of the current flowing through primary winding 87 is similar to that shown in FIG. 2A of the drawings. This current induces an AC voltage in the secondary winding 89 of the power transformer and this output voltage is rectified by the four bridge diodes 91. Electrical energy is delivered from the bridge rectifier 91 to the load 81 by means of a filter choke 92. A filtering capacitor 93 is connected in parallel with the load 81.

The base-to-emitter potentials for the four transistors, 83 to 86 are delivered from the source 88 by means of a transformer which comprises a primary winding 95 and four secondary windings 96 through 99. Winding 96 is directly connected between the base and emitter electrodes of the transistor 86. Winding 99 is connected in a similar fashion between the base and emitter electrodes of transistor 85. The base and emitter of transistor 83 are connected by the series combination of winding 97 and a PNPN device 100. The PNPN device is poled to allow positive current to flow from the base of transistor 83 through the winding 97 and the PNPN device 100 to the emitter of transistor 83. A diode 101 is connected in parallel with PNPN device 100 in order to allow reverse biasing base current to turn OFF transistor 83. A similar arrangement is provided for switching transistor 84. The winding 98 in series with PNPN device 102 is connected between the base and emitter of the switching transistor 84. As before, a diode 103 is connected in parallel with the PNPN device 102. The base of transistor 83 is additionally connected to the base of transistor 84 through resistance 124.

The four switching transistors, 83 through 86, are actuated by the square wave voltages induced in windings 96 through 99. Whenever the voltages induced in windings 97 and 99 are appropriate for turning transistors 83 and 85 ON, the voltages induced in windings 96 and 98 turn transistors 86 and 84 OFF. Transistor 85 is turned ON before transistor 83, however, because until a firing pulse appears, the PNPN device 100 blocks the forward-biasing base current which would otherwise be delivered to the transistor 83. During this delay time the voltage induced across winding 98 holds the base of transistor 83 reverse biased through the parallel combination of capacitor 123 and resistance 124 and diode 103. In a similar manner, transistor 84 turns ON somewhat later than the transistor 86.

The length of this delay time is determined by the control circuit 105 in response to the magnitude of voltage existing across the load 81. The structure and operation of the control circuit 105 is substantially identical to that of the control circuit 16 which was discussed in conjunction with FIG. 1 and like numerals have been used to designate those components whose position and function are common to the two drawings. As before, control circuit 105 is connected to the load by means of the load voltage input conductor 47 and receives a negative supply voltage from terminal 50.

The operation of the error detector portion of control circuit 105 is substantially identical to the operation of the error detector in control circuit 16. As before, the conductivity state of transistor 55 is determined by load voltage. In control circuit 105, however, an anti-hunt network is connected in the error detector stage. This network comprises inductor 111, capacitor 112 and resistance 113 which are connected in series between the base and emitter electrodes of the transistor 55. This network is employed to suppress any tendency of the inverter to exhibit undesired self-oscillations at the resonant frequency of filter inductance 92 and capacitor 93. The resonant frequency of the anti-hunt network, being identical to the resonant frequency of the load voltage filter, allows the network to shunt out positive feedback at the undesired frequency.

The delay interval is initiated as follows. If either transistor 83 or 84 is ON, diode 108 or 109 will be forward biased thus clamping the junction of resistances 69, 70 and 115 to ground. The timing capacitor 63 is charged positively by current through transistor 55, thus holding transistor 56 OFF. As soon as both transistors 83 and 84 are OFF, diodes 108 and 109 are reverse biased permitting timing capacitor 63 to discharge through resistances 69 and 70 into negative terminal 50.

The control circuit 105 is also provided with an arrangement for insuring that the PNPN devices are fired at a minimum fixed delay time following the appearance of forward-biasing potentials from the oscillator 88. This arrangement comprises a resistance 115 and a second timing capacitor 116. The capacitor 116 is discharged toward a negative value simultaneously with the discharge of the timing capacitor 63. A pair of diodes 117 and 118 are employed as a gate to prevent interaction between the two time reference circuits. The first one of the two timing capacitors 63 and 116 to reach a substantially zero potential allows the associated diode 117 or 118 respectively, to become forward-biased allowing the pulse generator transistor 56 to turn ON. Base current of transistor 56 flows until both timing capacitors 63 and 116 are fully charged.

A single output winding 120 is wound on the primary winding 64. This winding provides the firing pulses to both PNPN devices 100 and 102 through the resistances 121 and 122, respectively.

The embodiments which have been described are merely illustrative of the principles of the invention. It will be apparent to those skilled in the art that numerous modifications may be made without departing from the true spirit and scope of the invention.

What is claimed is:

1. In combination a source of direct current, a load circuit having an alternating current input and a direct current output, at least first and second transistor switches interconnected between said source and said load circuit, said switches being arranged such that when said first transistor switch is closed current flows through said load circuit input in one direction and when said second switch is closed current flows through said load circuit input in the opposite direction, an error detector for producing an output in response to fluctuations in the voltage appearing across the output of said load circuit, driving means for opening and closing said transistor switches in phase opposition, said driving means comprising a source of periodic forward biasing potential, first and second PNPN devices connected between said source of forward biasing potential and said first and second switches respectively, means for generating firing pulses that have a time position relative to said periodic forward biasing potential determined by said error detector output, and means for applying said firing pulses to said PNPN devices to gate said forward biasing potential to said switches.

2. Apparatus as set forth in claim 1 including a diode connected in parallel with said PNPN device for allowing reverse currents to flow around said PNPN device such that said first switch is held open during the absence of said forward-biasing potential.

3. Power conversion apparatus comprising, in combination, a source of a unidirectional voltage, first and second transistor switches, each of said switches having a transconductive path and a control path, said transconductive paths of said first and said second switches being connected in series across said source, a utilization circuit having an alternating-current input, said input being connected to the junction of said transconductive paths, and means for turning said first and said second switches ON and OFF in phase-opposition, said last-named means comprising a source of a periodic forward-biasing potential, first and second PNPN devices interconnected between said source of biasing potential and the control path of said first and second switches respectively, means for generating firing pulses having a time-position which is determined by the magnitude of energy delivered to said utilization circuit, and means for applying said firing pulses to said first and second PNPN devices such that said devices become conductive and gate said forward-biasing potential to said switches.

4. Apparatus for converting electrical energy from a direct-current source into alternating-current energy which comprises, in combination, four transistor switches each of which is provided with a control electrode and a transconductive path, said transistor switches being grouped into first and second pairs of switches having their transconductive paths serially connected across said voltage source, a load having an alternating current input and a direct current output, said load input connected between the junction of said first pair of switches and the junction of said second pair of switches, a control transformer having an input winding and four output windings, means for developing a periodic voltage across said input winding, said four output windings being connected to supply control voltages to the control electrodes of said four transistor switches, pulse-responsive gating means interposed between at least a pair of said output windings and the control electrodes of a pair of said switches for momentarily blocking turn-ON control voltages from said switches, means for generating firing pulses which are positioned in time in accordance with the magnitude of voltage across said load output, and means for applying said pulses to said gating means whereby said control voltages are gating through to turn said switches ON.

5. Apparatus as in claim 4 wherein said means for generating firing pulses comprises a blocking oscillator having a timing capacitor for determining the length of time between successive pulses, a transistor shunting said timing capacitor, and a biasing circuit connected across said load output for controlling the impedance of said transistor.

6. Power conversion apparatus comprising, in combination, a source of unidirectional voltage, first and second transistor switches, each of said switches having a transconductive path and a control circuit, said transconductive paths of said first and said second switches being connected in series across said source, a utilization circuit having an alternating-current input, said input being connected to the junction of said transconductive paths, and driving means for turning said first and said second switches ON and OFF in phase-opposition, said driving means comprising a source of a periodic forward-biasing potential, first and second PNPN devices interconnected between said source of biasing potential and the control circuit of said first and second switches respectively, means for generating firing pulses having a time-position which is determined by the magnitude of energy delivered to said utilization circuit, and means for applying said firing pulses to said first and second PNPN devices such that said devices become conductive and gate said forward-biasing potential to said switches, a source of a reverse biasing potential, a resistive circuit path connected between said source of reverse-biasing potential and the control electrodes of said first and said second switches, and diode means for allowing said reverse-biasing potential to be applied to said control electrodes in the absence of said forward-biasing potential.

References Cited

UNITED STATES PATENTS

| | | | |
|---|---|---|---|
| 2,821,639 | 1/1958 | Bright et al. | 321—47 |
| 2,991,410 | 7/1961 | Seike | 321—2 |
| 3,145,348 | 8/1964 | Massey | 321—16 |
| 3,219,906 | 11/1965 | Keller et al. | 321—45 |
| 3,246,226 | 3/1966 | Geisler et al. | 321—45 |

JOHN F. COUCH, *Primary Examiner.*

M. L. WACHTELL, *Assistant Examiner.*